US010438201B2

(12) United States Patent
Jones

(10) Patent No.: US 10,438,201 B2
(45) Date of Patent: Oct. 8, 2019

(54) SYSTEM FOR GENERATING A TRANSACTION SPECIFIC TOKENIZATION FOR A WEARABLE DEVICE

(71) Applicant: BANK OF AMERICA CORPORATION, Charlotte, NC (US)

(72) Inventor: Ralph Brian Jones, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 924 days.

(21) Appl. No.: 14/849,290

(22) Filed: Sep. 9, 2015

(65) Prior Publication Data
US 2017/0068956 A1 Mar. 9, 2017

(51) Int. Cl.
G06Q 20/00 (2012.01)
G06Q 20/40 (2012.01)
G06Q 20/32 (2012.01)
G06Q 20/36 (2012.01)

(52) U.S. Cl.
CPC ......... *G06Q 20/401* (2013.01); *G06Q 20/327* (2013.01); *G06Q 20/367* (2013.01); *G06F 2221/0711* (2013.01); *G06F 2221/2153* (2013.01)

(58) Field of Classification Search
USPC .......................................................... 705/75
See application file for complete search history.

(56) References Cited

U.S. PATENT DOCUMENTS 7,295,832 B2 11/2007 Hewel
8,196,066 B1 * 6/2012 Ouyang ............... G06F 3/04883
715/708

8,810,430 B2 8/2014 Proud
D717,956 S 11/2014 Alexander et al.
9,002,272 B2 4/2015 Friedlaender
9,016,565 B2 4/2015 Zhou et al.
9,044,150 B2 6/2015 Brumback et al.
(Continued)

FOREIGN PATENT DOCUMENTS

KR 20130047476 5/2013
WO WO 2014104436 3/2014
(Continued)

*Primary Examiner* — James D Nigh
*Assistant Examiner* — Isidora I Immanuel
(74) *Attorney, Agent, or Firm* — Michael A. Springs; Moore & Van Allen PLLC; Peter B. Stewart

(57) ABSTRACT

Embodiments of the invention are directed to systems, methods, and computer program products for authorizing and performing a user defined selected transaction based on receiving notification from a wearable device associated with the user that the wearable device sensed a predefined action. The system is configured to transmit a data sensing packet to a wearable device comprising software code configured to cause the wearable device to process actions of the user that are sensed by the wearable device; receive a selected transaction from the user that the user wishes to be performed based on the wearable device sensing a predefined action; associate the selected transaction with a response token to be communicated to the system when the wearable device senses the predefined action; transmit the response to the wearable device; receive the response token indicating that the predefined action was sensed by the wearable device; and perform the selected transaction.

18 Claims, 5 Drawing Sheets

(56) References Cited

U.S. PATENT DOCUMENTS

| | | |
|---|---|---|
| 9,274,599 B1 | 3/2016 | D'Amico et al. |
| 9,398,007 B1 | 7/2016 | Wegener et al. |
| 9,554,274 B1 | 1/2017 | Castinado et al. |
| 9,641,526 B1 | 5/2017 | Gopalakrishnan et al. |
| 9,942,222 B1 | 4/2018 | Fenton et al. |
| 9,953,312 B2 | 4/2018 | Lee |
| 10,223,937 B2 | 3/2019 | Pacchione |
| 2003/0028481 A1 | 2/2003 | Flitcroft et al. |
| 2004/0225613 A1 | 11/2004 | Narayanaswami |
| 2007/0183599 A1 | 8/2007 | Cohen et al. |
| 2007/0189194 A1 | 8/2007 | Hrastar |
| 2007/0199053 A1 | 8/2007 | Sandhu et al. |
| 2009/0146947 A1 | 6/2009 | Ng |
| 2009/0249342 A1 | 10/2009 | Johnson |
| 2012/0030043 A1 | 2/2012 | Ross et al. |
| 2013/0159195 A1 | 6/2013 | Kirillin et al. |
| 2013/0332509 A1 | 12/2013 | Schwartz et al. |
| 2014/0012701 A1 | 1/2014 | Wall et al. |
| 2014/0135631 A1 | 5/2014 | Brumback et al. |
| 2014/0157387 A1* | 6/2014 | Lee .................. G06F 21/30 726/7 |
| 2014/0230019 A1 | 8/2014 | Civelli et al. |
| 2014/0277649 A1* | 9/2014 | Chong .................. G06N 20/00 700/94 |
| 2014/0279528 A1 | 9/2014 | Slaby et al. |
| 2014/0280450 A1 | 9/2014 | Luna |
| 2014/0282877 A1 | 9/2014 | Mahaffey et al. |
| 2014/0351070 A1 | 11/2014 | Christner et al. |
| 2014/0380445 A1 | 12/2014 | Tunnell et al. |
| 2015/0040203 A1 | 2/2015 | Qian |
| 2015/0088757 A1 | 3/2015 | Zhou et al. |
| 2015/0127541 A1* | 5/2015 | Just ....................... G06Q 20/10 705/44 |
| 2015/0145656 A1 | 5/2015 | Levesque et al. |
| 2015/0147961 A1 | 5/2015 | Britt, Jr. et al. |
| 2015/0235205 A1 | 8/2015 | Sebestyen |
| 2015/0242837 A1 | 8/2015 | Yarbrough et al. |
| 2015/0262458 A1 | 9/2015 | Faaborg et al. |
| 2015/0294303 A1 | 10/2015 | Hanson et al. |
| 2015/0294306 A1 | 10/2015 | Grigg et al. |
| 2015/0348006 A1 | 12/2015 | Taveau et al. |
| 2016/0050204 A1 | 2/2016 | Anderson |
| 2016/0071094 A1 | 3/2016 | Krishnaiah et al. |
| 2016/0086155 A1 | 3/2016 | Candelore |
| 2016/0125677 A1* | 5/2016 | Williams ............ G07C 9/00111 340/5.81 |
| 2016/0135046 A1 | 5/2016 | Archibald et al. |
| 2016/0232516 A1 | 8/2016 | Dayan et al. |
| 2016/0261409 A1 | 9/2016 | French et al. |
| 2016/0314456 A1 | 10/2016 | Douglas et al. |
| 2016/0321651 A1 | 11/2016 | Douglas |
| 2016/0335626 A1 | 11/2016 | Ko et al. |
| 2016/0378963 A1* | 12/2016 | Anderson ............... G06F 21/32 726/19 |
| 2016/0379205 A1 | 12/2016 | Margadoudakis |
| 2017/0061414 A1 | 3/2017 | Castinado et al. |
| 2017/0061422 A1 | 3/2017 | Castinado et al. |
| 2017/0185759 A1 | 6/2017 | Schmidt et al. |

FOREIGN PATENT DOCUMENTS

| | | |
|---|---|---|
| WO | WO 2014133916 | 9/2014 |
| WO | WO 2014143916 | 9/2014 |

* cited by examiner

SYSTEM FOR GENERATING A TRANSACTION SPECIFIC TOKENIZATION FOR A WEARABLE DEVICE

BACKGROUND

Personal computing devices are constantly evolving into smaller and more portable devices for consumer use. Devices in the form of wearables have been developed, such as electronic watches and wrist bands containing electronic information. In some instances, the wearables may include consumer information and data that can be transferred by the consumer as a form of identification and/or as a form of payment. Systems are needed to operate seamlessly with such devices for consumer interaction and transactions.

BRIEF SUMMARY

Embodiments of the invention are directed to systems, methods, and computer program products for authorizing and performing a user defined selected transaction based on receiving a notification that the wearable device sensed a predefined action from a wearable device associated with the user.

In some embodiments of the invention, the invention is configured to at least transmit a data sensing packet to a wearable device. The data sensing packet includes instruction code that is stored on the wearable device which is configured to cause the wearable device to process actions of the user that are sensed by the wearable device. The data sensing packet may further interface with hardware and/or software of the wearable device for sensing the actions of the user.

In some embodiments, the invention may be configured to receive a selected transaction from the user. The selected transaction is performed based on the wearable device sensing a predefined action of the user. Therefore, when the user desires to perform the selected transaction, the user performs the predefined action that is sensed by the wearable device.

In yet other embodiments, the invention may be configured to associate the selected transaction with a response token to be communicated to a system of the invention when the wearable device senses the predefined action. The selected transaction may be further associated with the predefined action. The system may enable the user to supply a definition of the predefined action. In other embodiments, the predefined action may be a standard action that is typical of the wearable device (e.g. pushing a button on the wearable device). However, in other embodiments, the invention may not initially have a definition of the predefined action. In such a case, the wearable device must record the predefined action.

After associating the selected transaction with the response token, the invention may be configured to transmit the response token to the wearable device. Where the invention associates the response token with the predefined action, the invention may further transmit the information related to the predefined action to the wearable device.

The data sensing packet on the wearable device causes the wearable device to sense the actions of the user. The data sensing packet processes the sensed information to determine actions performed by the user and in particular the predefined action. In the instance that the wearable device senses the predetermined action, the invention may be configured to receive the response token indicating that the predefined action was sensed by the wearable device.

In some embodiments, in addition to receiving the response token, the invention may be further configured to receive authentication information that authenticates the user.

After receiving the response token and possibly the authentication information, the invention may be configured to actually perform the selected transaction.

In yet other embodiments of the invention, the invention may be configured to communicate two or more response tokens to the wearable device. Each of the two or more response tokens is associated with a predefined action that is sensed by the wearable device and a selected transaction to be performed based on the wearable device sensing the predefined action. The invention receives at least one of these response tokens based on the wearable device sensing the predefined action. The invention may then perform the selected transaction associated with the response token.

In other embodiments of the invention, the data sensing packet comprises executable code. The executable code may cause the wearable device to receive an indication that a user is in possession of the wearable device. The code may further cause the wearable device to authenticate the wearable device at a first time. This authentication may be based on receiving the indication that the user is in possession of the wearable device. The code may then cause the wearable device to receive an indication that the user wishes to execute a transaction. The wearable device may be configured to determine that the user continues to remain in possession of the wearable device. This determination may be based on continuously monitoring the wearable device from the first time. The code may then cause the wearable device to transmit a notification along with the response token indicating that the user desires to perform the transaction, and further along with an indication that the user previously performed an authentication process on the wearable device. The indication may further indicate that the user has remained in possession of the wearable device. The system can complete execution of the transaction based on at least determining that the user authenticated to the wearable and remained in possession of the wearable device.

In other embodiments of the invention, the user may have two or more associated wearable devices. The invention may be configured to register each of the wearable devices as associated with the user based at least on a unique identification associated with each of the respective wearable devices. Further, for each wearable device, the invention may be configured to receive one or more selected transactions from the user that the user wishes to be performed based on the wearable device sensing a predefined action. The invention may associate the one or more selected transactions with the predefined action to be sensed by the wearable device and a response token to be communicated to the invention when the wearable device senses the predefined action. The invention then transmits, to each of the wearable devices, a respective response token and information related to the predefined action associated with the response token.

While in another embodiment of the invention, the invention assigns unique response tokens to each of the wearable devices for each selected transaction and sensed predefined action.

In other embodiments of the invention, the code of the data sensing packet may be configured to cause the wearable device to sense multiple instances of the predefined action and determine that the number of the multiple instances of the predefined action sensed by the wearable device exceeds a limit. Depending on whether the number of the multiple instances of the predefined action sensed by the wearable device exceeds the limit, the invention may be configured to communicate the response token.

In yet other embodiments, the invention may be in communication with a transaction device. The data sensing packet is further configured to cause the wearable device to sense a predefined action by the user associated with the selected transaction. The wearable device may then send the associated response token to a system of the invention, thereby instructing the invention to perform the selected transaction.

In other embodiments of the invention, the invention may be configured to communicate a request to the user to consent to the completion of the selected transaction. The request comprises at least a description of the selected transaction. The user may communicate a response indicating the user consents to the completion of the selected transaction.

While in other embodiments, the selected transaction has an associated limitation restricting the invention to perform the selected transaction. The invention may be configured to receive a response token associated with the selected transaction indicating that the transaction is to be performed and receive information relating the selected transaction. Using this information, the invention may determine whether the selected transaction is subject to the limitation. If the invention determines the limitation does not apply, the invention may perform the selected transaction.

In yet other embodiments, the data sensing packet comprises instruction code configured to cause the wearable device to prompt the user to perform the predefined action for initially recording the predefined action. The wearable device may then sense the predefined action as the user performs the predefined action. After sensing the predefined action the wearable device may then store the sensed predefined action in memory.

Further in other embodiments, the invention may be configured to associate the response token with an expiration time for receiving the response token. The invention may then determine that the response token is received prior to an expiration of the time stamp. The invention may then perform the transaction.

BRIEF DESCRIPTION OF THE DRAWINGS

Figure 1:
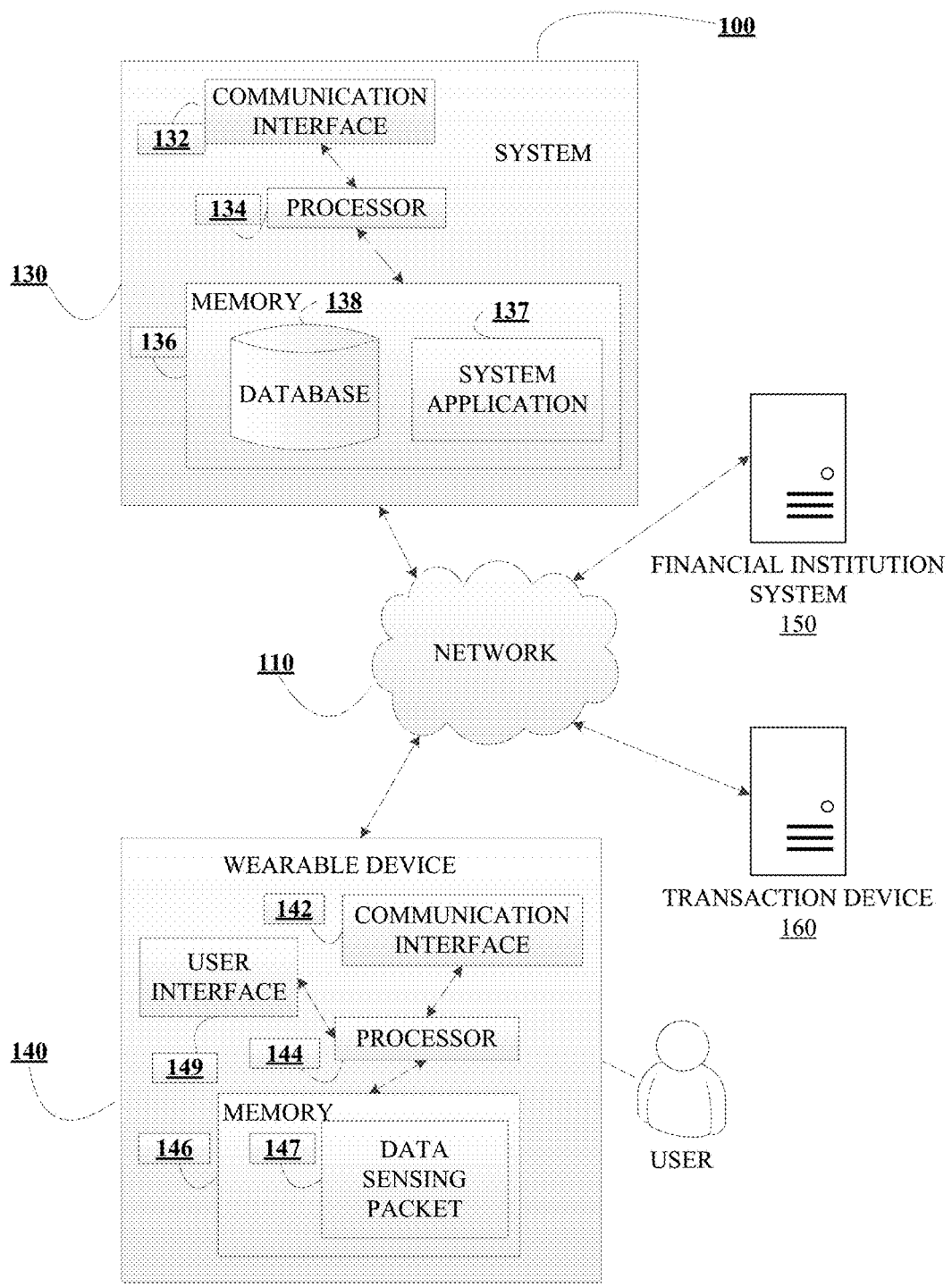
Figure 2A:
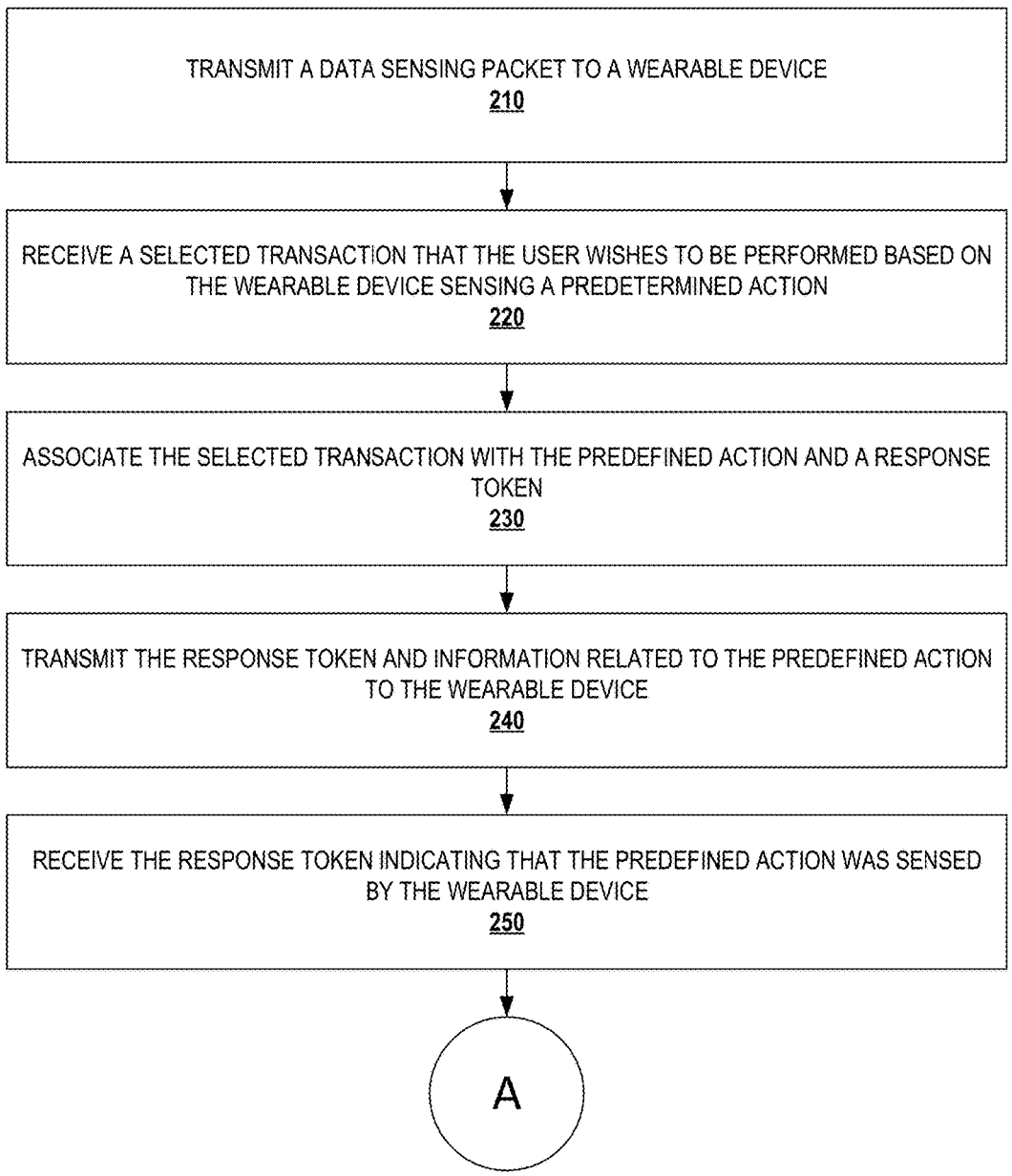
Figure 2B:
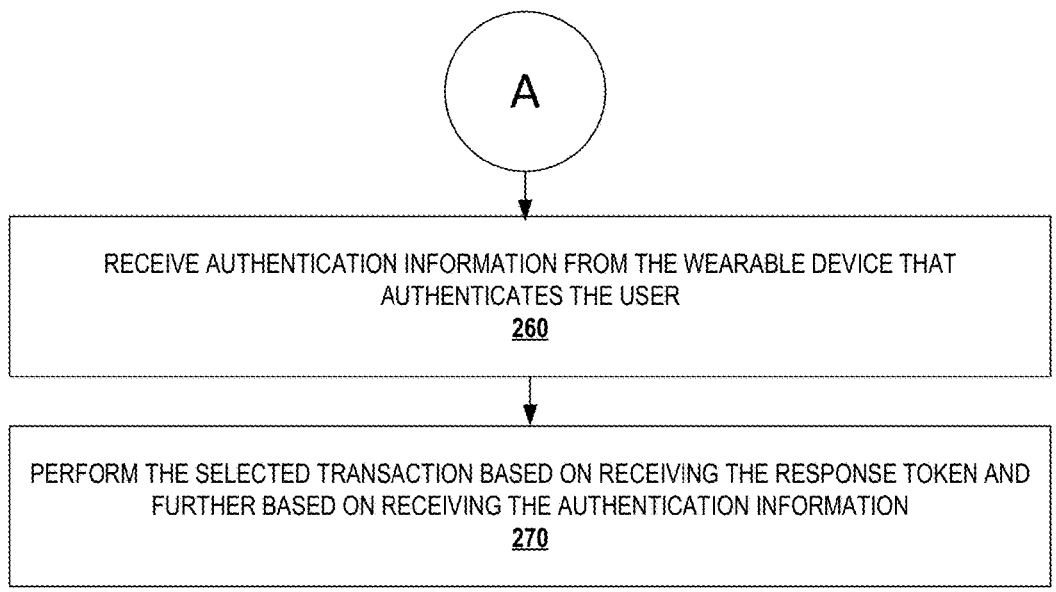
Figure 3:
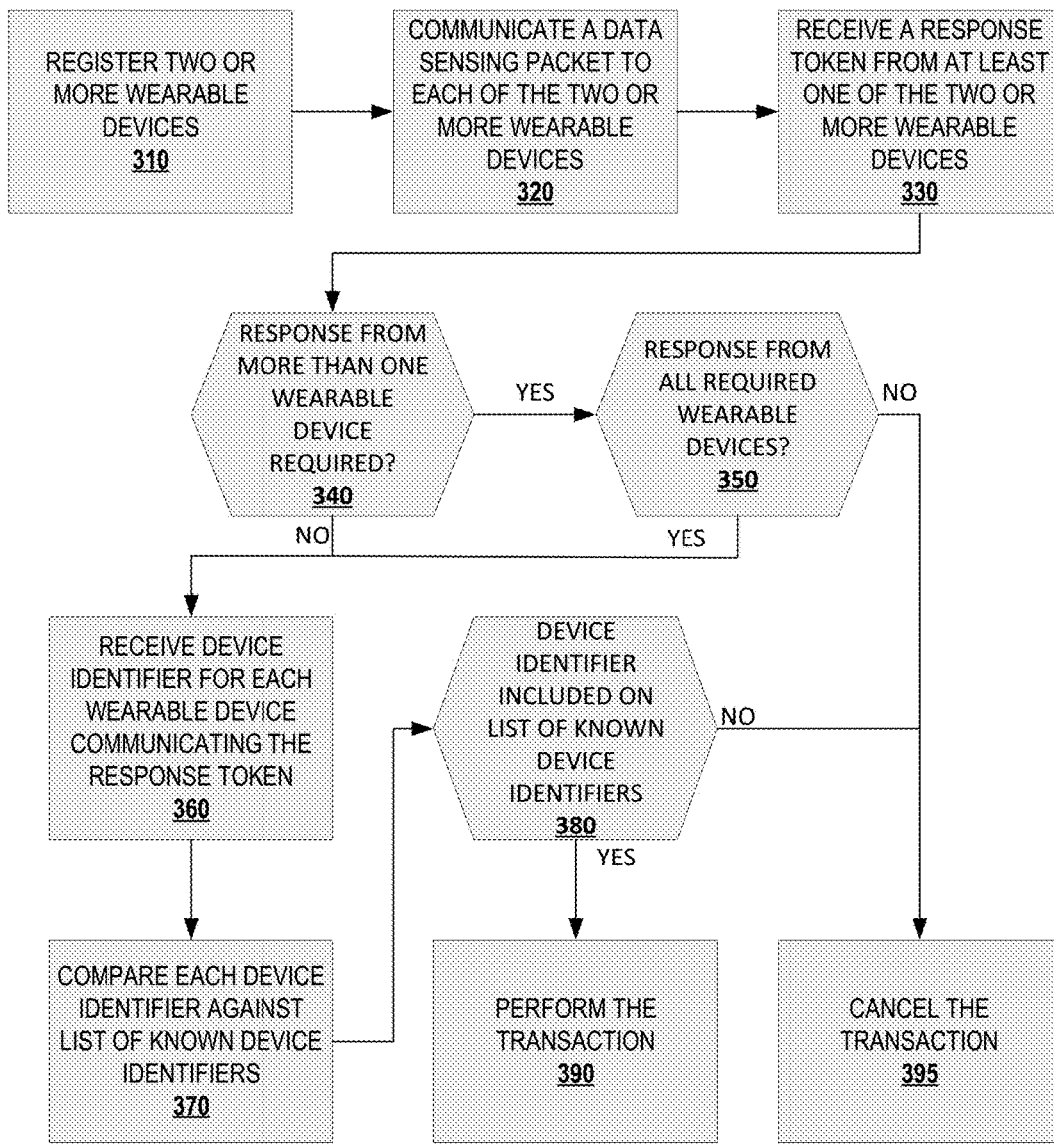
Figure 4:
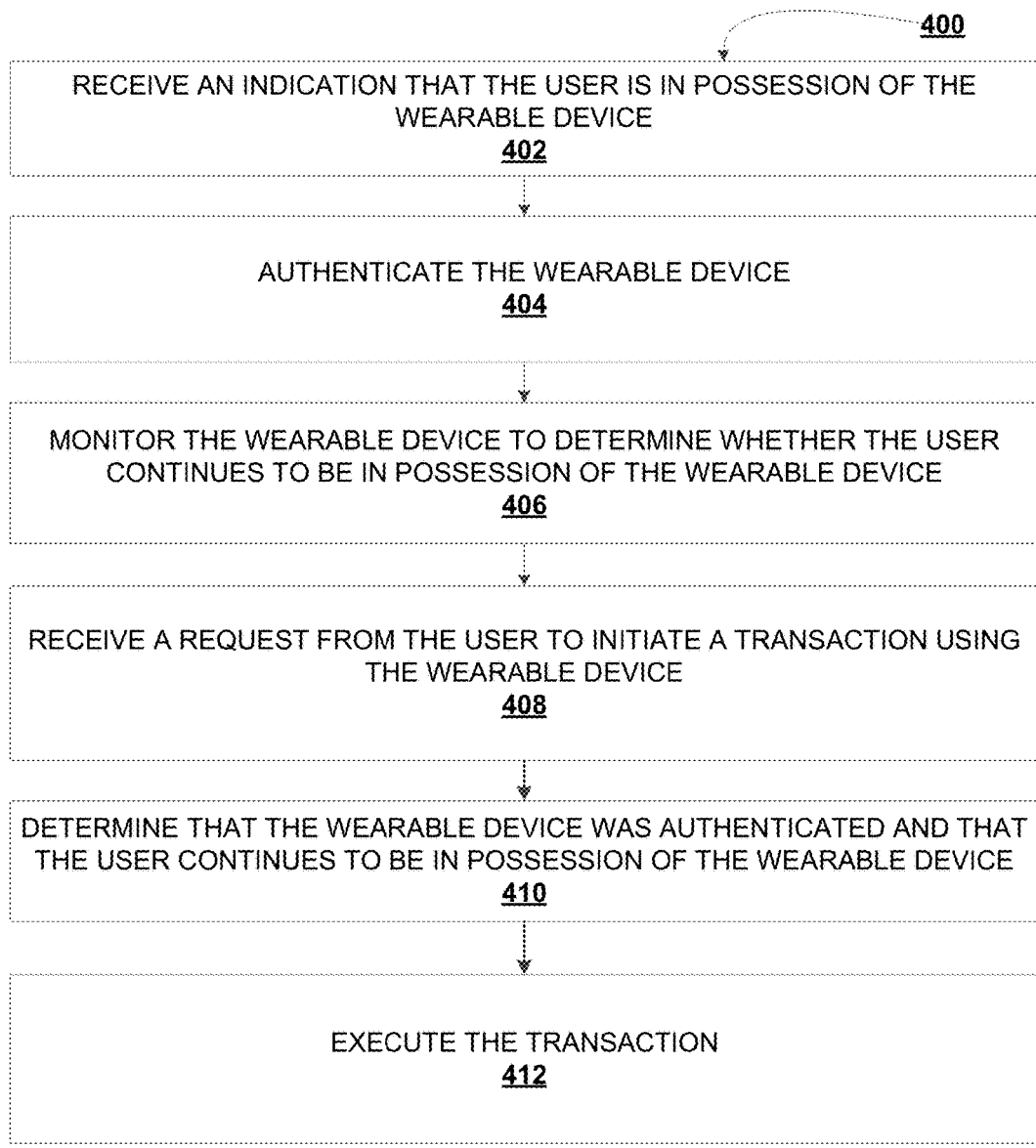

Having thus described embodiments of the invention in general terms, reference will now be made to the accompanying drawings, where:

FIG. 1 is a diagram illustrating a token management environment, in accordance with embodiments of the present invention;

FIG. 2A is a flow chart illustrating a general process flow for performing a selected transaction based on a wearable device sensing a predefined action performed by a user, in accordance with various embodiments of the invention;

FIG. 2B is a flow chart illustrating a general process flow for performing a selected transaction based on a wearable device sensing a predefined action performed by a user, in accordance with various embodiments of the invention;

FIG. 3 is a flow chart illustrating a detailed process flow for performing a selected transaction based on a wearable device sensing a predefined action performed by a user, in accordance with various embodiments of the invention; and FIG. 4 is a flow chart illustrating a detailed process flow for authenticating a token, in accordance with various embodiments of the invention.

DETAILED DESCRIPTION OF EMBODIMENTS OF THE INVENTION

Embodiments of the invention are directed to systems, methods, and computer program products for authorizing and performing a user defined selected transaction based on receiving notification from a wearable device associated with the user that the wearable device sensed a predefined action, such as a predefined action made by the user of the wearable device. Embodiments of the present invention may now be described more fully hereinafter with reference to the accompanying drawings, in which some, but not all, embodiments of the invention are shown. Indeed, the invention may be embodied in many different forms and should not be construed as limited to the embodiments set forth herein. Rather, these embodiments are provided so that this disclosure may satisfy applicable legal requirements. Like numbers refer to like elements throughout.

As will be described in further detail below, the invention is directed to enabling a user to easily perform a transaction by performing a predefined action using a wearable device. The user merely defines a movement, action, series of button pushes or other manipulation of the wearable device that the user wishes to associate with a transaction to occur. For example, the user may wish to have preset instructions for transferring $100 from the user's checking to the user's savings based on a command of the user. The user associates with this selected transaction with a sensed action of the wearable to trigger the transaction. For example, the wearable device may include sensors and a processor for sensing movement of the wearable device. The user can program a selected movement, such as movement of the wearable in a figure eight pattern to trigger the selected transaction. After set up, the user can trigger the selected transaction (i.e., transfer of $100 from checking to savings) by moving the wearable in a figure eight pattern.

To facilitate operation, a response token may be stored on the wearable device and associated with the selected transaction. When the wearable device senses the predefined movement, it retrieves the response token and transmits it to a system, such as a banking system. The banking system receives the token and then performs the selected transaction. Therefore, with little effort, the user may direct the system to perform a transaction. In some embodiments, the user may configure additional selected transactions with associated selected triggers and response tokens. With a single wearable device, the user may easily perform multiple actions that results in the completion of multiple transactions.

In some embodiments, the invention may provide added security through semi- or continuous monitoring of the wearable device. In the described system, the user is freed from having to use a bank card or log onto an online banking application to perform the selected transaction. However, this creates a transaction that may be considered non-card present or a transaction without direct input of credentials. As such, in some embodiments, the invention allows the user to initially authenticate themselves to the wearable, such as when the user puts on the wearable. The invention then monitors the wearable via motion sensors, biometric sensors, environmental sensors, location information, or the like to determine that the user has not removed the wearable over time. At the time the wearable device senses a triggering event, it may access the monitoring data to ensure that the user authenticated themselves earlier in the day and has possession of the wearable. This information can be passed along with the response token to the system as added information to be used as part of performing the selected transaction indicating authorization and authentication by the user for the transaction.

In some embodiments, an "entity" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loans associations, credit unions, investment companies, insurance companies and the like. In some embodiments, the entity may allow a user to establish an account with the entity.

As used herein, an "account" or "financial account" may be the relationship that the user has with the entity. Examples of accounts include a deposit account, such as a transaction account (e.g. banking account), a savings account, an investment account, a money market account, a time deposit, a demand deposit, a pre-paid account, a credit account, a rewards account, an electronic wallet, a non-monetary user profile that includes only personal information with the user, or the like. The account is associated with and/or maintained by the entity. In other embodiments, an entity may not be a financial institution. In still other embodiments, the entity may be a merchant.

In some embodiments, a "user" may be a customer (e.g. an account holder or a person who has an account at the entity) or a potential customer (e.g. person who has submitted an application for an account, a person who is the target of marketing materials that are distributed by the entity, a person who applies for a loan that has not yet been funded). Additionally, the user may an operator of one or more wearable devices.

Aspects of the present invention relate to tokenization, which is generally described in the area of financial transactions as utilizing a "token" (e.g., an alias, substitute, surrogate, or other like identifier) as a replacement for sensitive account information, and in particular account numbers. As such, tokens or portions of tokens may be used as a stand in for a user account number, user name, pin number, routing information related to the financial institution associated with the account, security code, or other like information relating to the user account. The one or more tokens may then be utilized as a payment instrument to complete a transaction. The one or more tokens may be associated with one or more payment devices directly or within one or more digital wallets associated with the payment devices. In other embodiments, the tokens may be associated with electronic transactions that are made over the Internet instead of using a physical payment device. Utilizing a token as a payment instrument instead of actual account information, and specifically an account number, improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token, and the transactions in which the token is used as a payment instrument. Single-use tokens may be utilized once, and thereafter disappear, are replaced, or are erased, while multi-use tokens may be utilized more than once before they disappear, are replaced, or are erased.

Tokens may be 16-digit numbers (e.g., like credit, debit, or other like account numbers), may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant (e.g., a specific business or individual user) and a user. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings, combinations thereof, or the like).

In other embodiments, tokens may be used to authenticate a device. In such embodiments, the token may be created by a tokenization system and communicated for storage on the device. The device may communicate the token or a form of the token to an authentication system for authentication. The device may be configured to manipulate the token to avoid communicating the original token for security purposes. Such manipulation may be performed using an algorithm and or keys that are known to the authentication system and the device. For example, the device may employ a secure hash algorithm (SHA) to encrypt the token using a dynamic key. The device communicates the encrypted token to the authentication system, where the authentication system uses the dynamic key to authenticate the encrypted token.

In some embodiments, the authentication system may not store a copy of the original token but instead may store an encrypted version of the token. The authentication system may receive a token from the device to be authenticated. The authentication system encrypts the token received from the device and compares the encrypted received token against the stored encrypted token for authentication.

The current invention is further directed toward wearable devices. Wearable devices are becoming more prevalent in a variety of markets and industries. The devices are being used in many operations, such as but not limited to identifying a user, storage and transmission of credentials, storage and transmission of financial information, general user-data storage, and the like. In particular, wearable devices are used more and more to share user credentials and to perform financial transactions. The wearable device may be a watch, an article of clothing, or another mobile device such as a mobile phone, MP3 player, or Personal Digital Assistant (PDA) or the like. As such, the wearable device may comprise at least one or more processors, memory, and executable code stored in memory that is executable by the one or more processors. The wearable device may also include an interface that allows a user to provide input to the wearable device and a display for communicating information to the user. In other embodiments, the wearable device may further comprise a communication device. The communication device may be configured to communicate over a wired or a wireless interface. Using the wired interface, the wearable device may communicate with other devices that are linked to a wired network or that communicate directly with the wired interface. Where the communication device includes a wireless interface, the wearable device may communicate with other devices that are ad hoc paired with the wearable device or communicate using a network with the wearable device.

In some embodiments, the wearable device may include sensors or other devices. Such sensors may include biometric sensors, motion sensors and/or accelerometers, light sensors, touch sensors, environmental sensors (e.g. temperature, humidity), and the like. The wearable device may be configured to utilize these sensors to determine trigger events. For example, the wearable device may be configured to sense when a user is walking. When the wearable device senses the walking motion of the user. Based on this trigger event, the wearable device may be configured to perform a given function (e.g. count the number of steps taken by the user). In other embodiments, the wearable device may utilize timer based triggers to perform a function and in particular, perform a measurement using one of the included sensors. For example, the wearable device may be configured to measure temperature every five minutes. Using the collected information, the wearable device may further analyze the information and compare such information against predefined limits. For example, if the wearable device measures temperature and senses a temperature greater than a predetermined limit, the wearable device may perform a function based on the sensed temperature exceeding the predetermined limit.

In yet other embodiments of the invention, the wearable device may be configured to receive software applications, such as the data sensing packet described below, in the form of a program, script, function or code that is stored on the wearable device that is processed by the wearable device and is capable of utilizing other hardware of the wearable device. For example, a wearable device may include an accelerometer and the wearable device includes the capability of taking readings from the accelerometer, but the wearable device may not be configured with code to actually take readings from the accelerometer. An application may be installed on the wearable device to take readings from the accelerometer using the functionality of the wearable device. Thus, the application instructs the wearable device to interface with the accelerometer to take readings. It is important to note that an external system may interface with the wearable device using an application to use the functionality of the wearable device. For example, a system may be configured to communicate with the wearable device through an application to receive temperature measurements sensed by the wearable device. Thus, the external system may instruct the wearable device using commands to take such measurements and communicate such measurements back to the system. In such an environment, the wearable device may include multiple applications and therefore may be an extension of multiple systems, each of which may utilize the same hardware.

This invention, in general, relates to performance of a transaction based on receipt of instructions from a wearable device, where the instructions are based on sensing a selected action at the wearable device. In some instances, the transactions may be financial transactions. A typical financial transaction executed by a user may require the user to present a payment vehicle (e.g., credit card, debit card, or the like) to the merchant to complete a transaction. During the process of executing the transaction, the merchant may require the user to provide additional authentication credentials to confirm the identity of the user. This may be in the form of a valid identification document, a signature, a personal identification number (PIN), or the like. Although this form of identification confirmation during the process of executing the transaction may provide a sense of trustworthiness to the merchant, it may result in unnecessary inconvenience to the user. With users performing a multitude of transactions using wearable devices in the financial industry, there is a need to ensure security and convenience. Although wearable devices may be used as a form of a payment vehicle at contactless point-of-sale terminals at merchant locations, the merchant may still have to confirm the identity of the user adorning the wearable device at every interaction to determine the trustworthiness of the user and reduce the likelihood of misrepresentation.

The present invention allows the user and the wearable device to be pre-authenticated when initially adorned by the user such that the user may not be required to provide additional identification information or authentication credentials at a point-of-sale terminal of a merchant. In this regard, the user may initiate an authentication request via the wearable device when initially adorning the wearable device. This may be done using a combination of various authentication credentials input directly into the wearable device or by pairing the wearable device with an auxiliary device (e.g., mobile device or the like) and authenticating the wearable device indirectly using the auxiliary device. The wearable device may then be monitored using biometric feedback received using physiologic tracking technology incorporated into the wearable device that can read, record, and store individual biometric traits such as heart rate, blood pressure, gait, or other types of physical activity to determine whether the wearable device has remained in continual possession of the user since authentication.

Once authenticated, the user may approach a point-of-sale terminal of a merchant and use the wearable device as a form of payment vehicle to execute the transaction. Since the wearable device has been pre-authenticated by the user and is determined to have remained in continual possession of the user since authentication, the user may be provided with the convenience of using the wearable device as a digital key (i.e. one touch operation) to execute the transaction without the need to provide additional identification information or authentication credentials at a point-of-sale terminal of a merchant. Further, this sense of security also transfers to the merchants who accept transactions using such a wearable device. The pre-authentication and possession monitoring of the wearable device provides the merchant with an increased level of confidence and thus reducing the likelihood of misrepresentation.

FIG. 1 presents an exemplary block diagram of the system environment 100 for implementing the process flows described herein in accordance with embodiments of the present invention. As illustrated, the system environment 100 includes a network 110, a system 130, a wearable device 140, a financial institution system 150, and a transaction device 160. Also shown in FIG. 1 is a user of the wearable device 140. The wearable device 140 may be a mobile device or other non-mobile computing device. The user may be a person who uses the wearable device 140 to perform an action which is sensed by the wearable device and processed by the data sensing packet 147. The data sensing packet 147 may be an application stored on the wearable device 140 that communicates with the system 130, perform a transaction, input information onto a user interface presented on the wearable device 140, process actions of the user, and the like. The data sensing packet 147 and/or the system application 137 may incorporate one or more parts of any process flow described herein.

As shown in FIG. 1, the system 130, the wearable device 140, the financial institution system 150, and the transaction device 160 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The wearable device 140 may include any computerized apparatus that can be configured to perform any one or more of the functions of the wearable device 140 described and/or contemplated herein. For example, the user may use the wearable device 140 to transmit and/or receive information or commands to and from the system 130. In some embodiments, for example, the wearable device 140 may include a mobile computing device, a personal digital assistant, a mobile phone, a tablet computing device, smart watch, and the like. As illustrated in FIG. 1, in accordance with some embodiments of the present invention, the wearable device 140 includes a communication interface 142, a processor 144, a memory 146 having an data sensing packet 147 stored therein, and in some instances, a user interface 149. In such embodiments, the communication interface 142 is operatively and selectively connected to the processor 144, which is operatively and selectively connected to the user interface 149 and the memory 146. In some embodiments, the user may use the data sensing packet 147 to execute processes described with respect to the process flows described herein. Specifically, the data sensing packet 147 executes the process flows described herein.

Each communication interface described herein, including the communication interface 142, generally includes hardware, and, in some instances, software, that enables the wearable device 140, to transport, send, receive, and/or otherwise communicate information to and/or from the communication interface of one or more other systems on the network 110. For example, the communication interface 142 of the wearable device 140 may include a wireless transceiver, modem, server, electrical connection, and/or other electronic device that operatively connects the wearable device 140 to another system such as the system 130. The wireless transceiver may include a radio circuit to enable wireless transmission and reception of information. Additionally, the wearable device 140 may include a positioning system. The positioning system (e.g. a global positioning system (GPS), a network address (IP address) positioning system, a positioning system based on the nearest cell tower location, or the like) may enable at least the wearable device 140 or an external server or computing device in communication with the wearable device 140 to determine the location (e.g. location coordinates) of the wearable device 140.

Each processor described herein, including the processor 144, generally includes circuitry for implementing the audio, visual, and/or logic functions of the wearable device 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the data sensing packet 147 of the memory 146 of the wearable device 140.

Each memory device described herein, including the memory 146 for storing the data sensing packet 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may utilize the volatile memory over the non-volatile memory by storing multiple pieces of information in the volatile memory, thereby reducing the load on the system and increasing the processing speed.

As shown in FIG. 1, the memory 146 includes the data sensing packet 147. In some embodiments, the data sensing packet 147 includes an interface for communicating with, navigating, controlling, configuring, and/or using the wearable device 140. In some embodiments, the data sensing packet 147 includes computer-executable program code portions for instructing the processor 144 to perform one or more of the functions of the data sensing packet 147 described and/or contemplated herein. In some embodiments, the data sensing packet 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the business. The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the data sensing packet 147. It will also be understood that, in some embodiments, the memory includes other applications. It will also be understood that, in some embodiments, the system application 137 is configured to communicate with the structured database 138, the wearable device 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

The financial institution system 150 is connected to the network 110 and is configured to communicate with each of the other devices connected to the network 150. Particularly, the financial institution system 150 is configured to receive communications from the system 130 to perform transactions as defined herein. The financial institution system 150 may further include information relating to financial accounts and/or transaction history of the user. In some embodiments, the financial institution system 150 may be maintained by a financial institution, while in other embodiments, the financial institution system 150 may be managed by the manufacture of the wearable device. In such instances, the financial institution system 150 may include information about the wearable device and the user.

The environment 100 may also include a transaction device 160 that is in communication with the other devices on the network 110. The transaction machine may be configured to communicate with the system 130 and the wearable device 140 to complete the functions described herein. The transaction device 160 may further communicate with the wearable device over a communicable link established between the transaction device 160 and the wearable device 140 to complete transactions as defined herein.

It will be understood that the embodiment of the system environment illustrated in FIG. 1 is exemplary and that other embodiments may vary. As another example, in some embodiments, the system 130 includes more, less, or different components. In some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the wearable device 140 is configured to initiate presentation of any of the user interfaces described herein.

Referring now to FIG. 2A and FIG. 2B, these figures collectively demonstrate a process flow 200 for authorizing and performing a selected transaction based on receiving notification of an action taken by a user via a wearable device, in accordance with several embodiments of the invention.

It should be noted that one or more of these steps may be performed by the system by enabling a user to interact with the system either directly or using a client computing device to communicate data to the system, such as a wearable device. In various embodiments, the client computing device may communicate with the system using an application stored on the client computing device (e.g., wearable device). The application may refer to a browser application or a customized application for the purpose included herein. The application may be configured to receive input from the user and cause such input to be communicated to the system.

In block 210, in some embodiments, the system may be configured to transmit an application referred to here as a data sensing packet to a wearable device. The data sensing packet comprises software code that is stored on the wearable device and configured to cause one or more processors of the wearable device to process actions of the user that are sensed by the wearable device. The data sensing packet may also include additional code that causes the wearable device to sense the actions of the user, such as the user interacting with the wearable via touching, selection of menu items, depression of buttons, and the like.

As illustrated in block 220, the system may be configured to receive a selected transaction from the user that the user wishes to be performed based on the wearable device sensing a predefined action. The system may be configured to receive a description of the selected transaction to be performed on request by the user based on the wearable device sensing a predefined action. The system enables a user, using a client computing device, to provide input to describe the selected transaction. The system may enable a user to select from a list of transactions or may enable the user to define a customized transaction. For example, the user may want to describe a transaction using simple terms and may enter a definition of "Transfer $5 from Account A to Account B." The system may parse this definition to determine a transaction type (e.g. transfer), an amount (e.g. $5), and associated accounts of the transaction (e.g. Account, Account B). After parsing the definition, the system may request the user to confirm the selected transaction. After the user selects or defines a transaction, the definition of the transaction is communicated to the system. The system may further enable to user to define limitations on the system to perform the transaction or instances when the transaction should not be performed. Some of the limitations may include location information, time and date information, or information about an account. For example, the user may define a limitation on how the transaction should be performed if the wearable device and the user are collocated within a given geographic area. If the wearable device and the user are not collocated within the geographic area, the system may decline the transaction.

In some embodiments, the system may enable the user to select a financial account of the user on which to perform the selected transaction. In some embodiments, depending on the selected transaction, the system may enable the user to select more than one account. For example, the selected transaction may include a transfer. The system enables the user to select a financial account from which an amount will be transferred from, and an account into which the amount will be transferred. Further in multiple embodiments, details of the selected transaction may not be initially defined (e.g. amount of the transaction, account of the transaction). Such details may be specified at a later point in time or simultaneous with the completion of the transaction. For example, the user may specify at the time of performing the selected transaction an amount of the selected transaction.

The predefined action that is sensed by the wearable device to trigger the transaction may be any action that the wearable device is capable of sensing based on the hardware or software capabilities of the wearable device. As described herein, the wearable device may include sensors to sense real world phenomena. For example, the wearable device may include an accelerometer that is capable of sensing motion. In other embodiments, the wearable device is capable of connecting with a sensor using either a wired or wireless connection. For example, the wearable device may include a short range network communication device such as a Bluetooth Module or a Near Field Communication Device. The wearable device may communicate with the sensor to receive readings from the sensor. In other embodiments, the sensors through which a wearable device may receive information may include, but is not limited to, communication devices, global positioning devices or other location sensing devices, accelerometers, cameras, light sensors, magnetometers, temperature sensors, light sensors, biometric sensors and the like. Further, the wearable device may also incorporate other hardware of the wearable device to collect information. In addition to the hardware, the wearable device may also include software to interpret information from the sensors. In some instances, this software may be the data sensing packet downloaded to the wearable device. The software may transform the readings to usable data. This software may be in the form of a software development kit (SDK). The wearable device may utilize any algorithm or code to obtain the usable data. For example, the system may include a microphone that transforms a wave signals from the voice of the user into a digital stream. The system utilizes a Fourier transform to analyze the signal. In a specific embodiment of the invention, a wearable device may include an accelerometer and the data sensing packet may instruct the wearable device to take readings from the accelerometer. The data sensing packet may be configured to cause the wearable device to take readings on a timed basis. While in other embodiments, the data sensing packet may be configured to receive requests from the system to take the readings.

As described later below, the wearable device is configured to transmit one or more response tokens to the system based on sensing a selected action or actions at the wearable device. The data sensing packet may be configured to cause the wearable device to sense any number of actions associated with the two or more of response tokens using one or more of these sensors. In a particular embodiment, the wearable device may sense a first action using a first sensor of the wearable device and the wearable device may further sense a second action using a second sensor the wearable device. For example, a wearable device may include an accelerometer for detecting motion of the wearable device and a biometric scanner. The system transmits a first response token to the wearable device that is associated with a first action that is sensed by the wearable device using the accelerometer. The system may further transmit a second response token to the wearable device that is associated with a second action that is sensed by the wearable device using the biometric scanner. The wearable device may sense both the first and the second actions using the appropriate sensors and when one of the actions is sensed by the wearable device, the wearable device communicates the appropriate response token to the system. In another embodiment, the wearable device may further sense multiple actions using a single sensor. For example, the wearable device may only include an accelerometer. The system may communicate multiple response tokens to wearable device that are associated with actions that are sensed using the accelerometer. The wearable device simultaneously monitors the accelerometer to sense any of the actions.

Block 230 illustrates the system being configured to associate the selected transaction with the predefined action and a response token. The predefined action is associated with the transaction such that when the predefined action is performed, the wearable device senses the action and is capable of referencing the transaction by sending a response token.

In some embodiments, the system may not have details on the predefined action. Such is the case if the user needs to define the predefined action. The data sensing packet may be configured to cause the wearable device to prompt the user to perform the predefined action for recording the predefined action. As the user performs the action for the first time, the wearable device may sense the predefined action and store the predefined action in memory. The wearable device may further request the user perform the action multiple times to improve the accuracy of sensing the predefined action at a future period of time.

In other embodiments, the system may be configured to communicate multiple response tokens to a wearable device that are stored therein. The system may associate a selected transaction with each of these response tokens. Further the wearable device may send one of these response tokens based on sensing a predefined action associated with the response token.

As defined in block 240, the system may be configured to transmit the response token and information related to the predefined action to the wearable device. Typically, the response token is stored in memory of the wearable device. Therefore, the wearable device may retrieve the response token at a later time, as described herein.

Block 250 illustrates the system being configured to receive the response token indicating that the predefined action was sensed by the wearable device. In some embodiments of the invention, the data sensing packet includes code that causes the wearable device to sense multiple instances of the predefined action. In these embodiments, the predefined action may be a repetitive action (e.g. taking a step). In order to avoid sending a response token every time the action is performed, the data sensing packet may cause the wearable device to count the number of times the action is performed. For example, the wearable device may include an accelerometer that measures the number of steps that a user takes within a given period of time. The wearable device may measure the number of steps taken by the user within the given period of time at 4000 steps. Although possible, if the wearable device transmitted a response token for every time a step was sensed, the wearable device would transmit 4000 response tokens. As mentioned, the wearable device may include a predetermined number of times or limit that the selected action must be sensed prior to the wearable device transmitting the response token. Following the above example, the wearable device may include a limit of 2000 steps. When the wearable device senses 2000 steps, the wearable device communicates a response token. Thus, in our example, the wearable device would transmit (2) two response tokens within the given period of time, i.e., one at 2000 steps and one at 4000 steps. In another embodiment, the wearable device may monitor an action over a period of time and communicate the number of actions sensed by the wearable device in the period of time. The system may be configured to translate the number of actions into details of the transaction that are communicated in the form of response tokens. Following example, the wearable device may sense the user stepped 4000 times in a monitored period of time of a day and transmit a response token that corresponds with this action. The system may transfer $0.01 from a checking account to a savings account for each of the steps taken by the user. The system calculates an amount to transfer of $40.00 from the checking account to savings account based on the 4000 steps taken by the user and the transfer rate of $0.01.

As illustrated in bock 260, the system may be configured to receive authentication credentials for authenticating the user. Particularly, when the device is provisioned by the user, the system may enable the user to enter personal information. This personal information may include, but is not limited to names, aliases, usernames, passwords, account information, and the like. Further, a wearable device will further include an identifier. This identifier may be assigned to the wearable device by the manufacture. In other embodiments, the identifier is assigned to the device by the system and is tracked by the system. In some embodiments, the personal information and the device identifier are stored by a third party system. In other embodiments, the system stores such association. The wearable device may store this device identifier and personal information. In addition to transmitting the response token, the wearable device may transmit authentication information as well. The system may authenticate this information for the purpose of determining whether to perform the transaction. In other embodiments, the authentication information may not be stored on the wearable device. Instead, when the user performs the action and the system receives the response token, the system may further request the user supply the authentication information. Such information may be transmitted from the wearable device or from another device. In some instances, the user may interact with a transaction device to supply the authentication information. The system may cause the transaction device to request the authentication information from the user. Thus, the authentication information is communicated to the system based on the user interacting with the transaction device.

Block 270 illustrates the system being configured to perform the selected transaction based on receiving the response token and further based on receiving the authentication information. In some embodiments of the invention, the system enables a user to set limitations for performing the selected transaction. These limitations may include, but are not limited to, geographic limitations, amount limitations, limitations on the beneficiary of a transaction, and the like. When the system receives a limitation and at the time the system receives the response token, the system determines is subject to the limitation. If the selected transaction is not subject to the limitation, the system may not perform the given transaction. For example, the system may receive a limitation in which only a given amount of money may be transferred within a given period of time. If the amount of money to be transferred as a result of receiving a response code is less than the limitation, the system may perform the transaction. However, if the amount of money is greater than the limitation, the system may decline to perform the transaction.

In another embodiment of the invention, the system is configured to communicate with a transaction device. The user may initiate a transaction using the transaction advice. The data sensing packet may include instruction code that causes the wearable device to sense a predefined action by the user associated with the selected transaction and send the associated response token to thereby instruct the system to perform the selected transaction.

In other embodiments of the invention, the system may be further configured to communicate a request to the user to consent to the completion of the selected transaction. The system may communicate the request to the wearable device or to another device accessible to the user. For example, the user may have a wearable device and a mobile phone. After the wearable device senses the action and communicates the response token, the system may communicate the request to the mobile phone of the user. Thus, if the wearable device becomes misplaced, the user may still have control over the completion of various financial transactions. In other embodiments, the wearable device may establish a communicable link with the other device, as defined herein. The other device may include the consent information necessary to complete the selected transaction and the other device communicates the consent information based on the detection of the communicable link or some other proximity detection device. Thus, the wearable device must be within a given distance of the other device in order for the system to complete the selected transaction.

In other embodiments of the invention, the system associates the response token with an expiration time for receiving the response token. The system determines whether the response token was received prior to the expiration of the expiration time. If the expiration time has not expired, the system may perform the selected transaction. However, if the expiration time has expired, the system may decline the selected transaction and in some embodiments, the system will decline the selected transaction.

Now referring to FIG. 3. FIG. 3 illustrates a process flow for analyzing sensed information from a wearable device for determining the occurrence of a predefined action. In some embodiments of the invention, the system may be configured to determine the occurrence of the predefined action, as illustrated herein. As illustrated in block 310, the system is configured to register two or more wearable devices that are associated with a user. Each of the two or more wearable devices is associated with the user based on a unique identification associated with each of the respective wearable devices.

Additionally, the system is configured to receive, for each of the wearable devices, one or more selected transaction from the user that the user wishes to be performed based on the wearable device sensing a given predefined action. After receiving the selected transactions, the system may associated the selected transactions with a predefined action that will be sensed by the wearable device and a response token to be communicated to the system when the wearable device senses the associated predefined action.

As defined in block 320, the system is configured to communicate a data sensing packet to each of the two or more wearable devices. The data sensing packet includes instruction code that causes the wearable device to process actions performed by the user. Additionally, the system may be configured to communicate the response token and a description of the predefined action to the wearable device.

As defined in block 330, the system is configured to receive a response token from at least one of the two or more wearable devices. Based on the two or more devices having the data sensing packet, the system may receive a response token from any of the two or more devices. When the system receives a response token, the system determines whether a response from more than one device is required for performing the selected transaction, as defined in block 340.

In some embodiments of the invention, the system may require only one wearable device to communicate a response token to perform the transaction. In other embodiments, the system may require multiple wearable devices to communicate a response token to perform the transaction. While in other embodiments, the system may require all the wearable devices to communicate response tokens. By requiring multiple devices to sense the predefined action, additional security is achieved. For example, a user may have two wearable devices. The first wearable device is a mobile phone and the second wearable device is a fitness tracker. The user carries both wearable devices and therefore, both wearable devices may be setup to sense the same predefined action. Such is the case when each of the wearable devices includes an accelerometer and the wearable devices are measuring an action performed by the user. If both of the wearable devices sense the action, then the system is able to perform the selected transaction. Where the system only requires one response token to be received, the system may be setup for convenience to the user. Following the above example, the user may forget to take one of the wearable devices on a given day. Under the strict guidelines described above, the user would be unable to perform the selected transaction. However, with the requirement of only needing one response token, the user is able to perform the transaction with either of the wearable devices.

If the system requires a response from more than one wearable device as illustrated in block 340, the system may advance to block 350. Otherwise the system advances to block 360. In block 350, the system determines whether a response has been received from all the required wearable devices. The system may determine whether all of the required responses have been received using timestamps. Each of the response tokens may include a time stamp. When the first response token is received, the system begins a time using the timestamp of the first response token as a reference time. The system calculates an expiration time and upon expiration of the expiration time determines whether all of the response tokens were receives, and whether the time stamps of each of the response tokens are prior to the expiration time. If the system has not received a response from all of the required devices, the system cancels the transaction as defined in block 395. Otherwise the system advances to block 360.

Block 360 illustrates receiving a device identifier for each wearable device that communicated a response token. The device identifier is compared against a list of known device identifiers as illustrated in block 370. As defined in block 380, if each of the device identifiers is included in the list of known device identifiers, the system performs the transaction as illustrated in block 390. Otherwise the system cancels the transaction as illustrated in block 395.

FIG. 4 illustrates a process flow for authenticating a wearable device, in accordance with an embodiment of the invention. As shown in block 402, the process flow includes receiving an indication that the user is in possession of the wearable device. Typically, the wearable device comprises one or more sensors configured to gather physiological and/or movement data to enable monitoring and possession of the wearable device by the user. The data gathered using the wearable device may be transmitted either to an auxiliary device (e.g. personal computing device, mobile device, or the like) or to an online storage site. The variety of sensors may be attributed to the types of stimuli that they correspond to (e.g., physiological vital signs, temperature, body movements, organic substances, or the like) and their placements (clothing, body part accessory, subcutaneous implant, or the like). In this way, the system may be configured to determine whether the user is in possession of the wearable device.

Next, as shown in block 404, process flow includes authenticating the wearable device. Typically, authenticating a wearable device may comprise sending an authentication request to the financial institution to associate (e.g., enroll) the wearable device with the user's online banking account. In this regard, the system may be configured to receive an authentication request from the user. The authentication request may be submitted by the user using the wearable device directly, or an auxiliary device previously paired to the wearable device. Typically, the wearable device may be securely paired with an auxiliary device by establishing a secure channel between the two unassociated devices over a short range wireless communication channel. In this way, a secure communicable link is created between the wearable device and the auxiliary device utilizing system application directives.

The authentication request includes device information associated with the wearable device and user information associated with the user and user's online banking account. The device information associated with the wearable device may be any information sufficient to generate a device "fingerprint", or a unique signature of the user's wearable device. The user information may be any information sufficient to identify the user and the user's online banking account. In some embodiments, the user information may include, but is not limited to, at least one of a username, contact information, a password, a PIN number, biometric information (e.g., physiological features such as fingerprints, finger vein and palm vein patterns, as well as iris and facial recognition to verify individual identities), a unique identification number associated with the user, social network information, an account number, or a card number. In some embodiments, the user information may be proprietary to the financial institution, such as an account number, a reference number to an account, a client number, or the like. In other embodiments, the user information may be public information, such as a phone number, mailing address, email address, or the like.

Next, as shown in block 404, the process flow includes authenticating the wearable device. In this regard, the system may be configured to associate the wearable device with the user. This association is based on comparing or matching the device information associated with the wearable device with user information associated with the user and user's online banking account. In doing so, the user may be authorized to access the online banking account using the wearable device to execute one or more transactions.

In some embodiments, the wearable device may be paired with an auxiliary device associated with the user. In these instances, the system may be configured to receive the authentication request from the user via an application or via a banking website downloadable on the auxiliary device. In this regard, the system may be configured to receive one or more authentication credentials from the user via the auxiliary device and authenticate the user based on the received authentication credentials. In response to successfully authenticating the user and the auxiliary device, the system may automatically authenticate the wearable device paired or communicably linked to the auxiliary device.

Next, as shown in block 406, the process flow includes monitoring the wearable device to determine whether the user continues to remain in possession of the wearable device. In this regard, the system may be configured to monitor the variety of sensors associated with the wearable device and the stimuli that they correspond to (e.g., physiological vital signs, temperature, body movements, organic substances, or the like). In some embodiments, the sensors may be monitored periodically to determine possession. In instances where the wearable device is paired with an auxiliary device, the system may be configured to monitor the auxiliary device and determine whether the mobile device continues to be paired to the wearable device. In this regard, the wearable device may be monitored based on at least determining a location of the auxiliary device paired to the wearable device using global positioning data, such as accessing auxiliary device global positioning systems (GPS) or the like. Global positioning data may include any information collected from methods, systems, apparatus, computer programs, or the like involving locating a position of the user's auxiliary device relative to satellites, fixed locations, beacons, transmitters or the like. In some instances, global positioning data may be collected from a GPS device, such as a navigation system. Such a navigation system may be, but is not limited to, hardware and/or software that is part of the auxiliary device. In response to determining the location of the auxiliary device and that the auxiliary device is still paired with the wearable device, the system may be configured to determine that the user continues to remain in possession of the wearable device. In some embodiments, both the auxiliary device and the wearable device may be concurrently monitored to determine that the user continues to remain in possession of the wearable device.

Next, as shown in block 408, the process flow includes receiving a request from the user to initiate a transaction using the wearable device. In some embodiments, the user may use the wearable device at a point-of-sale terminal of a merchant to execute a transaction. In this regard, the user may transmit an indication to execute a transaction using the wearable device. By way of example, the user may scan the wearable device at the point-of-sale of the merchant to execute a purchase. In this regard, the user may transmit a transaction request to the financial institution to initiate the execution of the purchase. The transaction request provided by the user may include, but not be limited to, the transaction type, the transaction amount, the transaction account, one or more related accounts, the transaction request date, and the like. In some other embodiments, the user may use the wearable device to execute other financial transactions such as, but not limited to, receiving statements related to an account history, processing automated teller machine (ATM) transactions, transferring funds from domestic or international accounts, process commercial payments related to online bill-pay, peer-to-peer payments, account withdrawals, account deposits, and/or the like.

Next, as shown in block 410, the process flow includes determining that the wearable device was authenticated and that the user continues to remain in possession of the wearable device. In some embodiments, the wearable device may only have to be authenticated once at a first time stamp. The wearable device may then be continuously monitored to determine whether the user continues to remain in possession of the wearable device from the first time stamp when the wearable device is authenticated until a second time stamp when receiving the request to initiate a transaction. In instances where the wearable device is paired with an auxiliary device, the system may determine the location of the auxiliary device and then determine whether the auxiliary device continues to remain paired with the wearable device. In response, the process flow includes executing the transaction, as shown in block 412.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for authorizing and performing a user defined selected transaction based on receiving notification from a wearable device associated with the user that the wearable device sensed a predefined action, wherein the system comprises:
   a memory;
   a communication interface;
   one or more processors; and
   executable code stored in memory, wherein the code, when executed by the one or more processors, causes the one or more processors to:
      transmit, to first and second wearable devices associated with the user, via said communication interface, a data sensing packet, wherein the data sensing packet comprises software code that is stored on the first and second wearable devices and configured to cause the first and second wearable devices to process physical movements of the user that are sensed by the first and second wearable devices;
      receive a definition of a selected transaction from the user that the user wishes to be performed based on the first and second wearable devices sensing a predefined physical movement of the user;
      associate the selected transaction with 1) the predefined physical movement to be sensed by the first and second wearable devices and 2) a response token;
      transmit, to the first and second wearable devices, the response token and information related to the predefined physical movement associated with the response token;
      receive the response token from the first wearable device;
      in response to receiving the response token from the first wearable device, determine that the user performed the predefined physical movement using the first wearable device;
      in response to receiving the response token from the first wearable device, calculate an expiration time based on a timestamp of the response token from the first wearable device;
      receive the response token from the second wearable device;
      in response to receiving the response token from the second wearable device, determine that the user performed the predefined physical movement using the second wearable device;

receive authentication information that authenticates the user;

determine whether the response token from the second wearable device was received prior to the expiration time; and in response to determining whether the response token from the second wearable device was received prior to the expiration time: (a) cancel the transaction based on the response token from the second wearable device not being received prior to the expiration time or (b) perform the selected transaction based on receiving the response token from the first wearable device and from the second wearable device prior to the expiration time and further based on receiving the authentication information.

2. The system of claim 1, wherein the sensing packet comprises executable code configured to cause the first wearable device to:

receive an indication that the user is in possession of the first wearable device;

authenticate the first wearable device at a first time based on at least receiving the indication that the user is in possession of the first wearable device;

receive an indication that the user wishes to execute the selected transaction;

determine that the user continues to remain in possession of the first wearable device based on at least continuously monitoring the first wearable device from the first time; and transmit a notification along with the response token indicating that the user desires to perform the selected transaction, along with an indication that the user previously performed an authentication process on the first wearable device and that the user has remained in possession of the first wearable device, wherein said system performs the selected transaction based on at least determining that the user authenticated to the first wearable device and remained in possession of the first wearable device.

3. The system of claim 1, wherein the executable code further comprises instruction code configured to cause the one or more processors to:

communicate two or more response tokens to the first wearable device, wherein each of the multitude of response tokens is associated with a different physical action that can be sensed by the first wearable device and a transaction to be performed based on sensing the physical action.

4. The system of claim 1, wherein the executable code further comprises instruction code configured to cause the one or more processors to:

register each of the first and second wearable devices as associates with the user based at least on a unique identification associated with each of the first and second wearable devices.

5. The system of claim 4, wherein the executable code comprises instruction code configured to cause the one or more processors to assign unique response tokens to each of the first and second wearable devices for each of a plurality of selected transactions and sensed physical movements of the user.

6. The system of claim 1, wherein the data sensing packet comprises instruction code configured to cause the first wearable device to:

sense multiple instances of the predefined physical movement;

determine that the number of the multiple instances of the predefined physical movement sensed by the first wearable device exceeds a predetermined limit; and communicate the response token based on determining the number of the multiple instances of the predefined physical movement sensed by the first wearable device exceeds the predetermined limit.

7. The system of claim 1, wherein the executable code further comprises instruction code configured to cause the one or more processors to:

communicate a request to the user to consent to completion of the selected transaction, wherein the request comprises at least a description of the selected transaction; and receive a response from the user indicating the user consents to the completion of the selected transaction.

8. The system of claim 1, wherein the executable code further comprises instruction code configured to cause the one or more processors to:

determine whether the selected transaction is subject to a limitation; and performing the selected transaction if the limitation does not apply.

9. The system of claim 1, wherein the data sensing packet comprises instruction code configured to cause the first wearable device to:

prompt the user to perform the predefined physical movement for initially recording the predefined physical movement;

sense the predefined physical movement as the user performs the predefined physical movement; and store the sensed predefined action in memory.

10. A computer program product for authorizing and performing a user defined selected transaction based on receiving notification from a wearable device associated with the user that the wearable device sensed a predefined action, the computer program product being embodied on a non-transitory computer readable storage medium having computer readable program code embodied therewith, the computer readable program code being configured to cause one or more processors to:

transmit, to first and second wearable devices associated with the user, a data sensing packet, wherein the data sensing packet comprises software code that is stored on the first and second wearable devices and configured to cause the first and second wearable devices to process physical movements of the user that are sensed by the first and second wearable devices;

receive a definition of a selected transaction from the user that the user wishes to be performed based on the first and second wearable devices sensing a predefined physical movement of the user;

associate the selected transaction with 1) the predefined physical movement to be sensed by the first and second wearable devices and 2) a response token;

transmit, to the first and second wearable devices, the response token and information related to the predefined physical movement associated with the response token;

receive the response token from the first wearable device;

in response to receiving the response token from the first wearable device, determine that the user performed the predefined physical movement using the first wearable device;

in response to receiving the response token from the first wearable device, calculate an expiration time based on a timestamp of the response token from the first wearable device;

receive the response token from the second wearable device;

in response to receiving the response token from the second wearable device, determine that the user performed the predefined physical movement using the second wearable device;

receive authentication information that authenticates the user;

determine whether the response token from the second wearable device was received prior to the expiration time; and in response to determining whether the response token from the second wearable device was received prior to the expiration time: (a) cancel the transaction based on the response token from the second wearable device not being received prior to the expiration time or (b) perform the selected transaction based on receiving the response token from the first wearable device and from the second wearable device prior to the expiration time and further based on receiving the authentication information.

11. The computer program product of claim 10, wherein the sensing packet comprises executable code configured to cause the first wearable device to:

receive an indication that the user is in possession of the first wearable device;

authenticate the first wearable device at a first time based on at least receiving the indication that the user is in possession of the first wearable device;

receive an indication that the user wishes to execute the selected transaction;

determine that the user continues to remain in possession of the first wearable device based on at least continuously monitoring the first wearable device from the first time; and transmit a notification along with the response token indicating that the user desires to perform the selected transaction, along with an indication that the user previously performed an authentication process on the first wearable device and that the user has remained in possession of the first wearable device, wherein the selected transaction is performed based on at least determining that the user authenticated to the first wearable device and remained in possession of the first wearable device.

12. The computer program product of claim 10, wherein the computer readable program code being further configured to cause the one or more processors to:

communicate two or more response tokens to the first wearable device, wherein each of the response tokens is associated with a different physical action that can be sensed by the first wearable device and a transaction to be performed base on sensing the physical action.

13. The computer program product of claim 10, wherein the computer readable program code being further configured to cause the one or more processors to: register each of the first and second wearable devices as associated with the user based at least on an unique identification associated with each of the first and second wearable devices.

14. The computer program product of claim 13, wherein the computer readable program code being further configured to cause the one or more processors to assign unique response tokens to each of the first and second wearable devices for each of a plurality of selected transactions and sensed physical movements of the user.

15. The computer program product of claim 10, wherein the data sensing packet comprises instruction code configured to cause the first wearable device to:

sense multiple instances of the predefined physical movement;

determine that the number of the multiple instances of the predefined physical movement sensed by the first wearable device exceeds a limit; and communicate the response token based on determining the number of the multiple instances of the predefined physical movement sensed by the first wearable device exceeds the limit.

16. A computer implemented method for authorizing and performing a user defined selected transaction based on receiving notification from a wearable device associated with the user that the wearable device sensed a predefined action, wherein the method comprising:

transmitting, to first and second wearable devices associated with the user, a data sensing packet, wherein the data sensing packet comprises software code that is stored on the first and second wearable devices and configured to cause the first and second wearable devices to process physical movements of the user that are sensed by the first and second wearable devices;

receiving a definition of a selected transaction from the user that the user wishes to be performed based on the first and second wearable devices sensing a predefined physical movement of the user;

associating the selected transaction with 1) the predefined action to be sensed by the first and second wearable devices and 2) a response token;

transmitting, to the first and second wearable devices, the response token and information related to the predefined physical movement associated with the response token;

receiving the response token from the first wearable device;

in response to receiving the response token from the first wearable device, determining that the user performed the predefined physical movement using the first wearable device;

in response to receiving the response token from the first wearable device, calculating an expiration time based on a timestamp of the response token from the first wearable device;

receiving the response token from the second wearable device;

in response to receiving the response token from the second wearable device, determining that the user performed the predefined physical movement using the second wearable device;

receiving authentication information that authenticates the user;

determine whether the response token from the second wearable device was received prior to the expiration time; and in response to determining whether the response token from the second wearable device was received prior to the expiration time: (a) canceling the transaction based on the response token from the second wearable device not being received prior to the expiration time or (b) performing the selected transaction based on receiving the response token from the first wearable device and from the second wearable device prior to the expiration time and further based on receiving the authentication information.

17. The system of claim 1, wherein the executable code further comprises instruction code configured to cause the one or more processors to, in response to determining whether the response token from the second wearable device was received prior to the expiration time, cancel the transaction based on the response token from the second wearable device not being received prior to the expiration time.

18. The system of claim 1, wherein the executable code further comprises instruction code configured to cause the one or more processors to, in response to determining whether the response token from the second wearable device was received prior to the expiration time, perform the selected transaction based on receiving the response token from the first wearable device and from the second wearable device prior to the expiration time and further based on receiving the authentication information.

* * * * *